A. D. HILL.
LICENSE TAG HOLDER AND MEANS TO ILLUMINATE SAME.
APPLICATION FILED MAR. 30, 1921.

1,390,291. Patented Sept. 13, 1921.

Inventor
Amos D. Hill

UNITED STATES PATENT OFFICE.

AMOS D. HILL, OF LANSING, MICHIGAN.

LICENSE-TAG HOLDER AND MEANS TO ILLUMINATE SAME.

1,390,291.  Specification of Letters Patent.  Patented Sept. 13, 1921.

Application filed March 30, 1921. Serial No. 457,126.

*To all whom it may concern:*

Be it known that I, AMOS D. HILL, citizen of the United States, residing at Lansing, in the county of Ingham and State of Michigan, have invented certain new and useful Improvements in License-Tag Holders and Means to Illuminate Same, of which the following is a specification.

This invention relates to a holder for license tags as used on automobiles, motor trucks, motorcycles, etc. which includes improved means whereby the license tag may be illuminated so that it may be easily identified at night.

The main object of my invention is to provide a device of the above character which comprises in addition to the improved holder for the license tag proper, novel means whereby the holder may be quickly attached or detached from the automobile, truck, motorcycle, etc. and wherein the means for illuminating the license tag also has facilities for illuminating the tail light, should occasion so require.

A further object of the invention is to provide a new and novel license tag holder including such means as above described, that is simple in construction, strong and durable and which it is believed may be manufactured at a reasonably low cost.

Various other objects and advantages of my invention will become apparent during the continuance of the following description.

In the drawings:—

Fig. 3 is a view in front elevation showing my invention as in its preferred embodiment and in a detached relation to the carrying means, or the vehicle which it is to be associated with.

Figure 4:
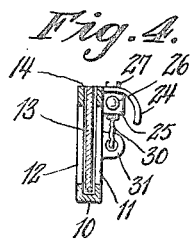
Fig. 4 is a view in transverse cross section taken on line 4—4 of Fig. 3.
Figure 5:
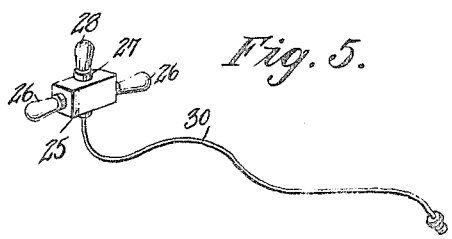
Fig. 5 is a view in perspective of the means for illuminating the license tag and the tail light of the automobile or other vehicle in connection with which the invention is used.

In describing my invention more in detail, 10 indicates the license tag holder proper which is preferably made of metal and which is of box like form as clearly shown in Fig. 4. The front and rear sides of the holder are cut away as at 11 and 12 so that face of the license tag 13 may be viewed and the holder is also open at its upper end as at 14 to facilitate the insertion and removal of the license tag with respect thereto.

At its ends, the holder 10 is equipped with suitable brackets 15 which are secured in place as at 16. The brackets 15 are in turn connected, at their outer ends, as at 17 to clips 18 that loosely carry supporting rings 19. The rings 19, will give laterally with respect to the clips 18 thus compensating for a slight give in the holder 10 and will also tend to absorb, to a great extent, the lateral jars or shocks that would otherwise be imparted to the holder.

Each of the rings 19 is equipped with a threaded collar 20 that receives an exteriorly threaded pin or bolt 21 and each bolt is in turn provided with a novel form of hook 22. A nut or other suitable fastening means designated by the numeral 23 may be positioned on the pin or bolt 21 within the respective ring 19 so as to limit the movement of the pin or bolt in one direction with respect to the ring. By reason of the adjustment afforded by the pin or bolt 21 with respect to the ring 19, it will be observed that the device is rendered applicable to machines in which the supporting members are spaced apart at different distances.

Figure 1:
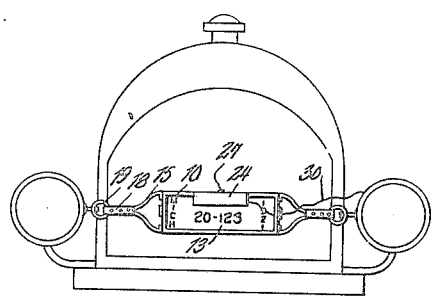
Figure 1 is a view in front elevation of my invention showing the same as applied to the front of an automobile.

When the device is to be associated with the front of an automobile as shown in Fig. 1, the hook 21 may be engaged with the lamp carrying bracket while if the holder is to be carried at the rear of the automobile, the hooks may be engaged with the spare tire carrying bracket. After the device has been arranged in place, the hooks 22 may be properly adjusted with respect to the rings 19 so as to insure the maintenance of the holder 10 in its proper position at all times.

Figure 2:
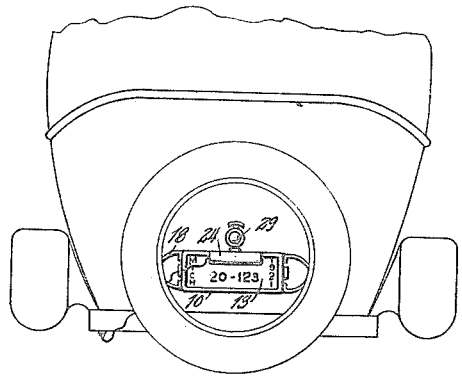
Fig. 2 is a similar view showing the device applied to the spare tire rack carried at the rear of an automobile.
Figure 3:
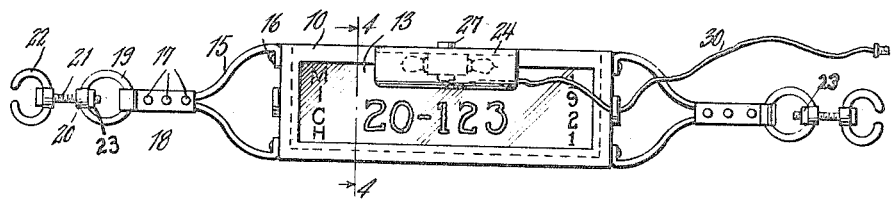

The holder 10, may also be provided, on its front face, with a suitably formed reflector 24 which supports, as shown in Fig. 4, a combination lamp socket 25. The socket 25 may be provided with light globes 26 which lie in a horizontal plane and which when lighted will illuminate the front face of the license tag 13. One connection of the combination socket 25 however, as shown at 27, projects upwardly through the reflector 24 and carries a globe 28 which may be employed to illuminate the tail light 29 when the latter is associated with the reflector 24 as shown in Fig. 2. A combination socket 25 is provided with an electrical connecting wire 30 which extends therefrom through the eye of a lug 31 on the holder 10 and is connected at its other end to a suitable source of power in the automobile or other vehicle in connection with which the device is employed.

From the foregoing it is believed that the advantages and novel features of my invention will be readily understood and therefore further detailed description is deemed unnecessary.

What is claimed is:—

1. In a device of the character described, a body portion to receive a license plate, brackets carried by said body portion, clips carried by said brackets, supporting rings carried by said clips and free to move laterally with respect thereto and adjustable means carried by said supporting rings to facilitate the connection of said device to a supporting means, substantially as described.

2. A license tag holder comprising a holder for the license tag, a reflector projected outwardly from the holder adjacent the upper edge thereof, a lamp socket on the under side of the reflector and provided with radially disposed light globes, one of which projects above the reflector to provide a tail light, and an electrical connecting member connected at one end to the said lamp socket and carrying a plug at its other end for connection to a suitable source of supply.

In testimony whereof I affix my signature.

AMOS D. HILL.